INVENTOR.
LESLIE R. WALSTROM
BY
Braddock & Burd
ATTORNEYS

INVENTOR.
LESLIE R. WALSTROM

BY
Braddock & Burd
ATTORNEYS

INVENTOR.
LESLIE R. WALSTROM
BY
Braddock & Burd
ATTORNEYS

INVENTOR.
LESLIE R. WALSTROM
BY
Braddock & Burd
ATTORNEYS

INVENTOR.
LESLIE R. WALSTROM
BY
Braddock & Burd
ATTORNEYS

INVENTOR.
LESLIE R. WALSTROM
BY
Braddock & Burd
ATTORNEYS

INVENTOR.
LESLIE R. WALSTROM
BY
Braddock + Burd
ATTORNEYS

United States Patent Office 3,454,218

Patented July 8, 1969

3,454,218

SELECTIVE PUNCH DEVICE

Leslie R. Walstrom, Excelsior, Minn., assignor to Fabri-Tek Incorporated, Minneapolis, Minn., a corporation of Wisconsin Filed Aug. 8, 1966, Ser. No. 570,849
Int. Cl. G06k *1/10*
U.S. Cl. 234—39 12 Claims

ABSTRACT OF THE DISCLOSURE

An electrical-mechanical tape punch for converting data from octal notation to 8-level binary-coded octal notation having a single motor driven rotor operable to sequentially perform punching operations in tape and intermittently drive the tape through a punch assembly. The punch has a plurality of keys which selectively move links between the rotor and the punch assembly to form a selected force transmitting means operable to force selected punches through the tape. After the punching operation is complete a one-way ratchet drive moves the tape to the next information station. On completion of one revolution of the rotor a switch is opened to stop the rotor drive motor.

The invention relates to peripheral equipment for a data processor operable to perforate sheet means to provide the sheet means with data in the form of holes. More particularly, the invention is directed to a low-cost electrical-mechanical tape punch operable to convert data from octal notation to eight-level binary-coded octal notation.

Briefly described, the punch of this invention is an electrical-mechanical machine having a punch assembly operable to simultaneously perforate sheet means, as tape, cards or the like, with a sprocket hole and data hole to provide an information station. The machine is a portable self contained unit which has its own tape supply contained in a support base. The tape engages a drive means which intermittently moves the tape through the punch assembly to provide the tape with a series of longitudinal spaced information stations.

The punch assembly and the tape advancing drive means are operated in synchronism by a rotor means driven by an electric motor. A first power transmitting means operably connects the rotor means with the punch assembly so that on rotation of the rotor means the punch assembly perforates the tape to provide a sprocket hole and zero to six selected data holes. The first power transmitting means includes actuator links positioned behind an array of punches in the punch assembly. Located between the actuator links and the rotor means is an actuator bail. On rotation of the rotor means the actuator bail is moved forward causing selected actuator links to force punches aligned with the links through the tape. The actuator links are moved into operative position relative to the punches in response to movement of toothed sliding selector links actuated by numbered keys. The keys and the selector links have a mechanical code selection arrangement which converts octal notation into eight-level binary-coded octal notation.

The rotor means also actuates a second power transmitting means operable to actuate the tape advancing means. On rotation of the rotor means the tape intermittently advances from station to station through the punch assembly after the holes are punched in the tape. The rotor means further operates a limit index switch causing the drive motor for the rotor means to stop after one function has occurred. The rotor means synchronizes the operation of the punch assembly, the tape advancing means and the motor driving the rotor means.

Figures 1, 14:
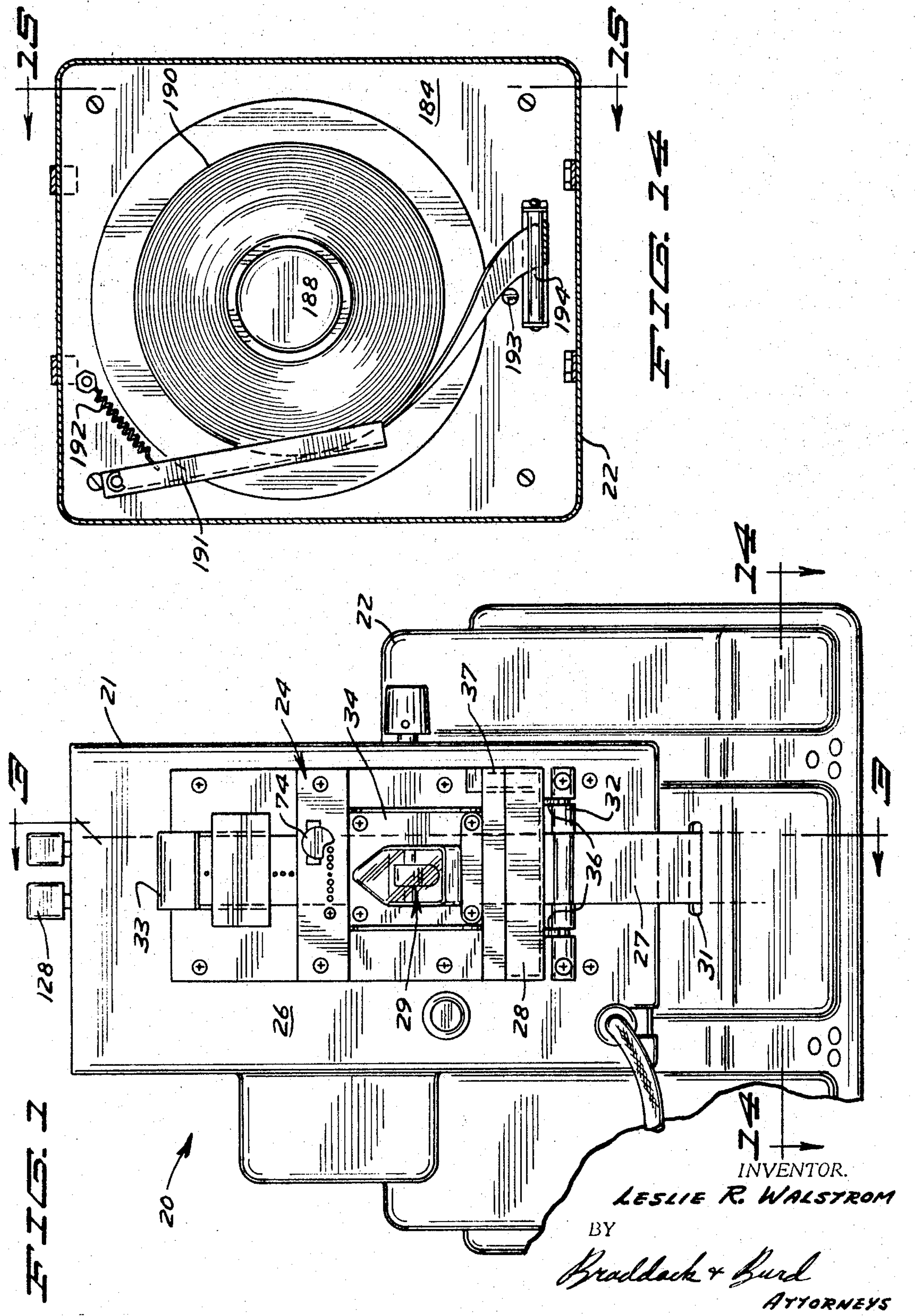
FIGURE 1 is a rear elevational view of the tape punch of this invention.
FIGURE 14 is a sectional view taken along the line 14—14 of FIGURE 1.
Figure 16:
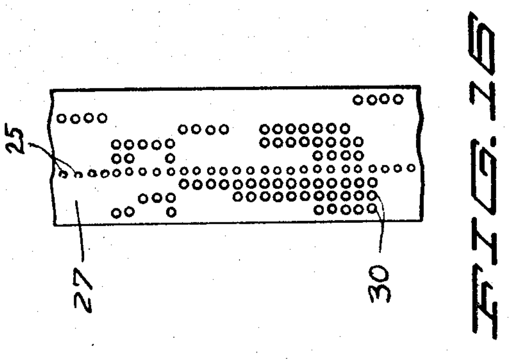
FIGURE 16 is a plan view of a strip of eight-level punched tape.

As shown in FIGURE 1, the punch of this invention indicated generally at 20 is an electrical-mechanical machine suitable for use in connection with a training-type computer. The punch functions to provide sheet means 27, as paper tape, with sprocket holes and data holes, the data holes arranged in eight-level binary-coded octal notation. FIGURE 16 shows a portion of tape 27 having a longitudinal line of sprocket holes 25 and data holes 30 located in eight-level binary-coded octal notation.

The operative parts of the punch are located in an upright housing 21 mounted on a rectangular base 22. A punch assembly indicated generally at 24 mounted on front wall 26 of the housing is operable to perforate sheet means 27, as paper tape, with sprocket holes 25 and binary-coded data holes 30. A sprocket hole and data holes are simultaneously made in the tape at each transverse information station. The data holes may be omitted. The paper or chad removed from the tape falls into a box 29 removably mounted on the front wall below the punch assembly.

Tape 27 is intermittently moved through punch assembly 24 by a drive mechanism indicated generally at 29 to provide the tape with consecutive information receiving stations. As shown in FIGURE 1, tape 27 moves upwardly along front wall 26 through an elongated slot 31 in base 22 under a cylindrical guide 32 mounted on the front wall and under chad box 28. Drive mechanism 29 engages the tape and intermittently moves the tape through punch assembly 24. As the tape leaves the punch assembly 24 it is turned outwardly by an arcuate deflector member 33.

The chad from punch assembly 24 falls downwardly onto a shield 34 covering the drive mechanism 29 into the chad box 28. The bottom wall of box 28 has a pair of downwardly projected legs 36 which partially surround cylindrical guide 32 providing a support for the box. A magnet 37 secured to one side of the box 28 releasably holds the box on front wall 26.

Figure 3:
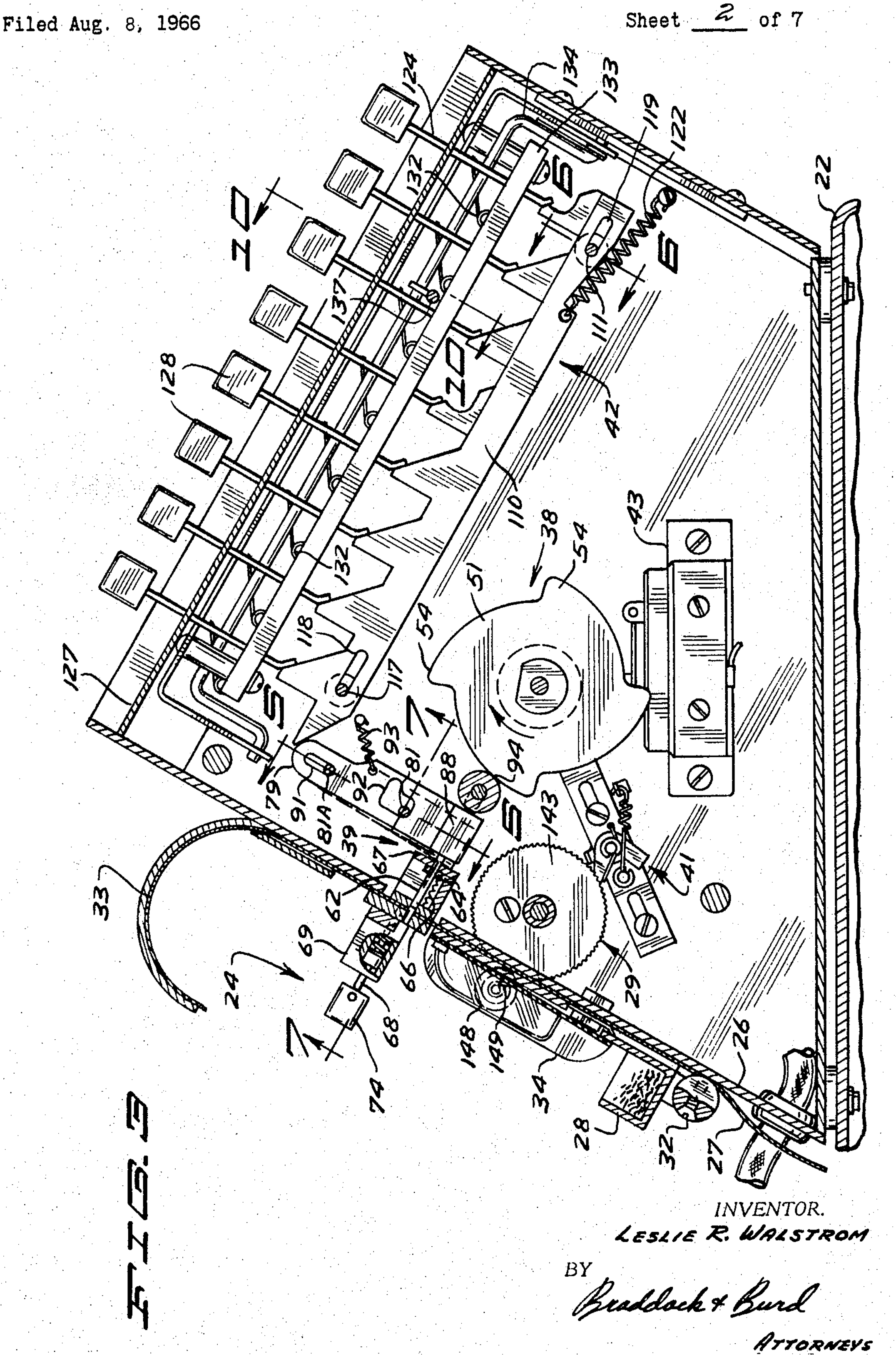
FIGURE 3 is an enlarged sectional view taken along the line 3—3 of FIGURE 1.

Punch assembly 24 and drive mechanism 29 are controlled in a timed sequence by a rotor indicated generally at 38. As shown in FIGURE 3, interposed between rotor 38 and punch assembly 24 is a first motion selection and transmitting means indicated generally at 39 for transmitting movement of the rotor to selected punches of the punch assembly. The motion of rotor 38 is transmitted through a second motion transmitting means indicated generally at 41 to drive mechanism 29 to intermittently advance tape 27 through punch assembly 24. The tape is advanced through the punch assembly after the holes are punched in the tape. A coded control mechanism indicated generally at 42 is manually operable to actuate the motion selection and transmitting means 39 for converting octal notation into eight-level binary-moded octal notation. Rotor 38 also controls a limit index switch 43 operable to stop the rotor after one function has occurred. The rotor operates as a single means to synchronize the punching and tape advancing operations of the punch.

Figure 12:
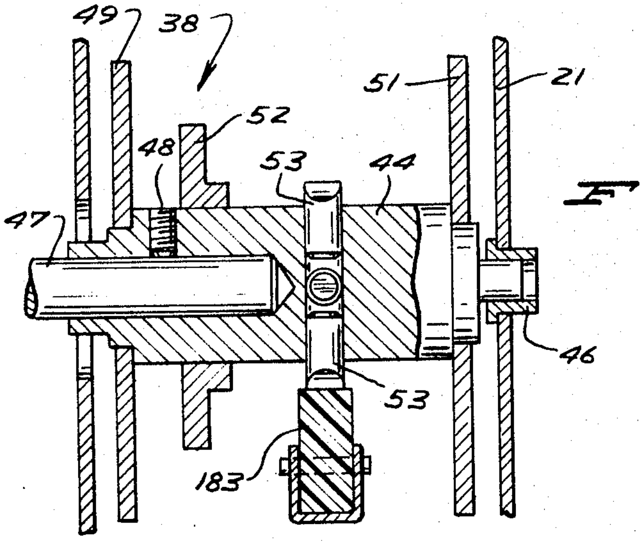
FIGURE 12 is a sectional view taken along the line 12—12 of FIGURE 9.

As shown in FIGURE 12, rotor 38 has an axial hub 44 rotatable at one end in a bearing 46 carried by an upright wall of housing 21. A shaft 47 projects into a bore in the opposite end of hub member 44. A set screw 48 secures hub 44 to shaft 47. Secured to the opposite ends of hub 44 are punch cams 49 and 51 engageable with the first motion selection and transmitting means 39 to operate the punches of the punch assembly. Mounted on hub 44 between cams 49 and 51 is a drive cam 52 for operating the second motion transmitting means in timed relation with the first motion transmitting means. In addition to cams 49, 51 and 52, hub 44 carries four circumferentially spaced cam fingers 53 which control the operation of limit switch 43. Each cam finger 53 projects radially from hub 44 and terminates in a wedge shaped end.

Figure 8:
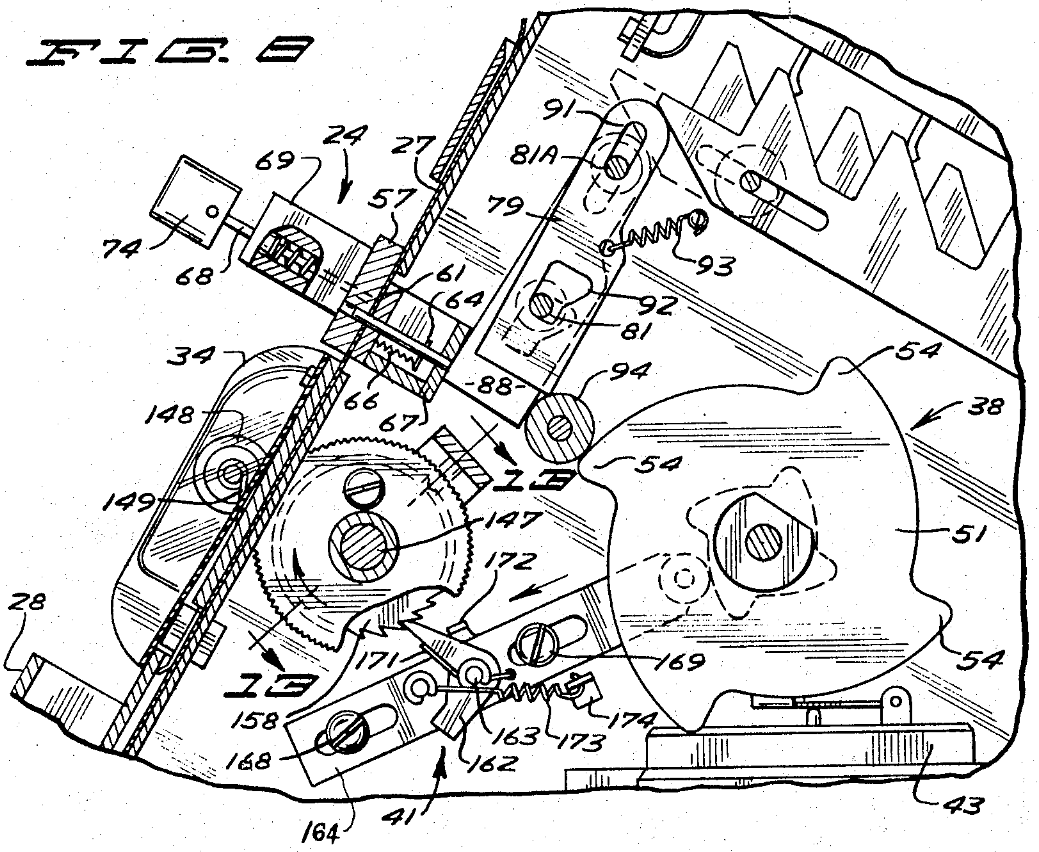
FIGURE 8 is a sectional view similar to FIGURE 3 showing the rotor cam operating the punch assembly.
Figure 9:
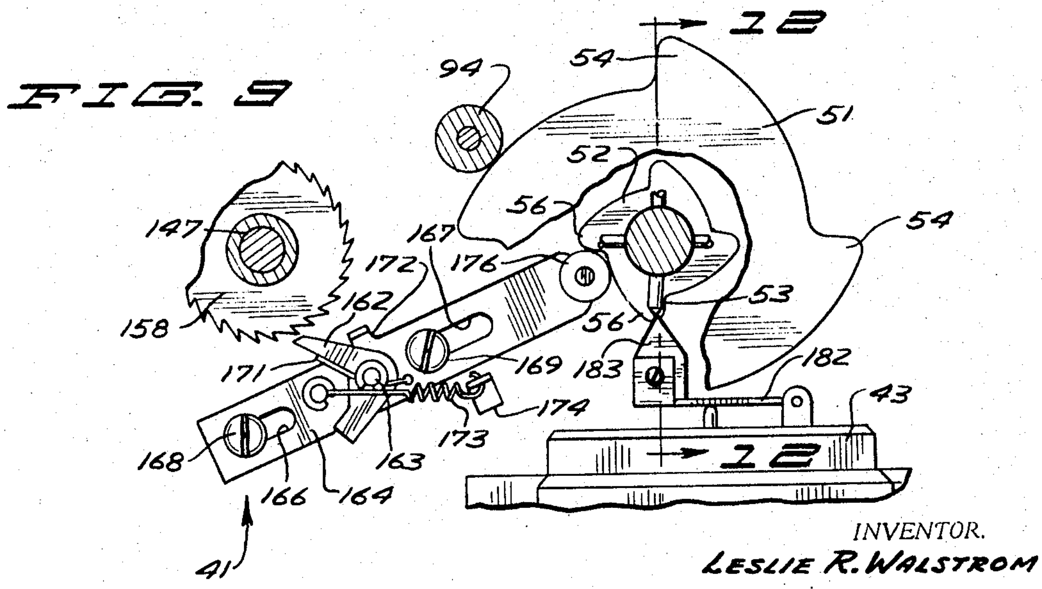
FIGURE 9 is a fragmentary sectional view similar to FIGURE 8 showing the rotor operating the index switch and tape advancing drive.

Punch cams 49 and 51 are identical in size and shape. As shown in FIGURES 3 and 8, each punch cam has four radial lobes 54 spaced approximately 90 degrees from each other so that on each revolution of the rotor punch assembly 24 is operated four times. As shown in FIGURE 9, drive cam 52 has four equally spaced radial lobes 56. Lobes 54 and 56 are in substantial axial alignment with cam fingers 53.

Figures 2, 7:
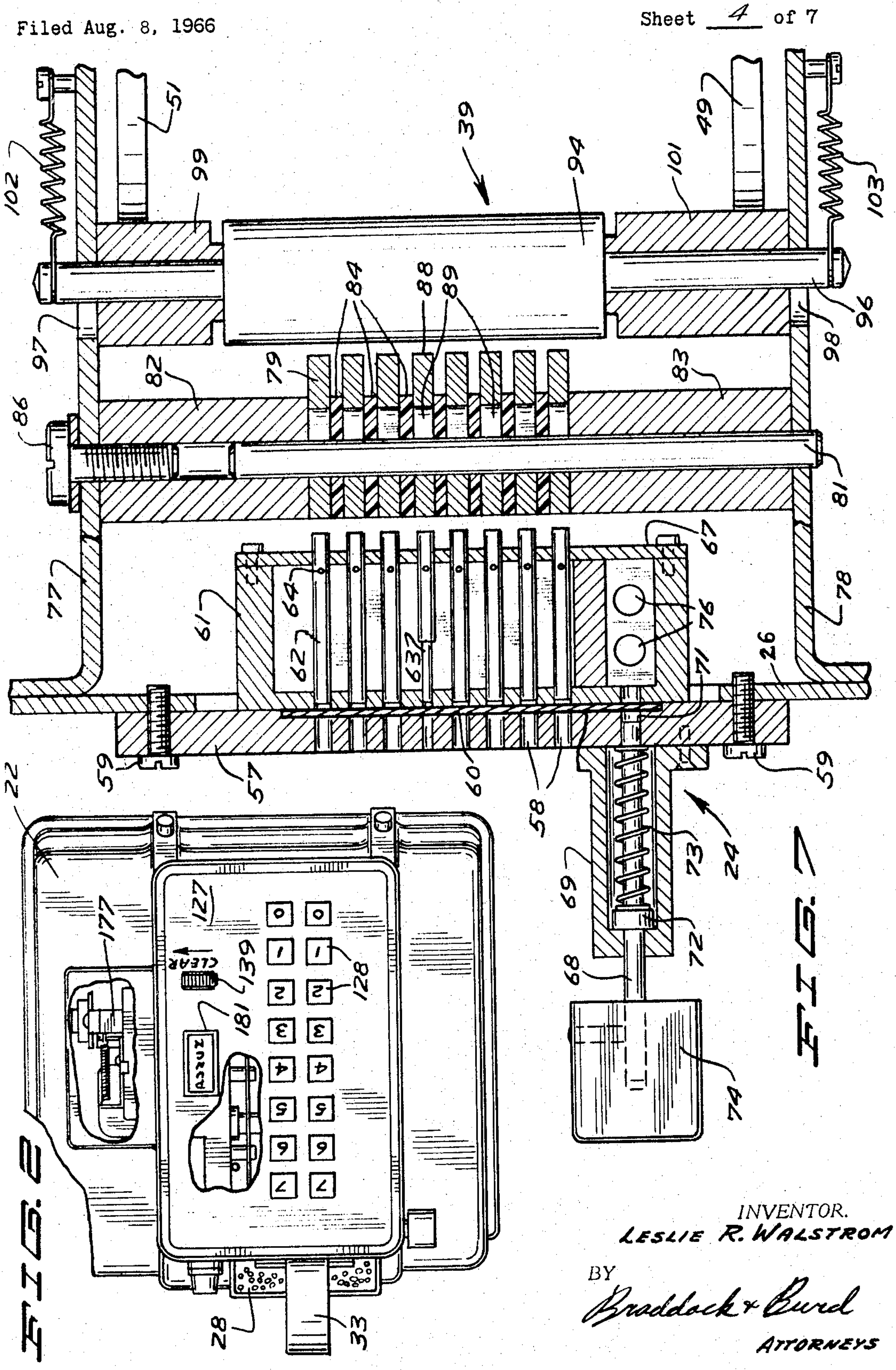
FIGURE 2 is a plan view of the tape punch with parts of the housing broken away.
FIGURE 7 is an enlarged sectional view taken along the line 7—7 of FIGURE 3.

Referring to FIGURE 7, there is shown punch assembly 24 removably mounted on the upright forward wall 26. Punch assembly 24 comprises a die or flat plate 57 having an array of eight transversely aligned punch receiving holes 58. Bolts 59 secure plate 57 to upright wall 26. A frame 61 having a generally U-shaped cross-section is secured to the back of plate 57 over a rectangular groove or cut out 60 in the back of plate 57. Groove 60 forms a passageway for guiding the tape 27 as it moves through the punch assembly. An array of eight transversely aligned punches 62 are carried by frame 61 in alignment with holes 58 in the die 57. The fourth or sprocket punch 63 has a smaller diameter than the remaining punches. In use punch 63 forms the sprocket drive holes 25 in the tape. Each punch carries a transverse pin 64 which abuts against a removable cover plate 67 used to hold the punches in assembled relation with frame 61. As shown in FIGURES 3 and 8, a spring 66 engages pin 64 biasing the punch away from plate 57. Spring 66 holds pin 64 against plate 67 locating the forward end of the punch in the base of frame 61 adjacent the inside of tape 27. Each punch is biased in a rearward direction to a non-punch position by springs similar to spring 66. The rear ends of the punches project through suitable holes in plate 67 secured to the back of frames 61.

As shown in FIGURE 7, secured to the outside of plate 57 is an error punch 68 carried in a cylindrical housing 69 located at one end of plate 57. Plate 57 has a hole 71 open to rectangular groove 60 accommodating the forward end of error punch 68. Located within housing 69 is a collar 72 secured to punch 68. A spring 73 engages the collar and the plate to bias the punch 68 into a non-punch position. The outer end of punch 68 carries a knob 74 used to manually move the punch. In use, the punch 68 is pressed through plate 57 into the frame 61 forming a hole in the tape. As shown in FIGURE 8, punch 68 is located in a transverse plane above punches 62 in alignment with the last punched holes in the tape. Actuation of punch 68 provides the tape with a hole indicating that the last punched hole or holes are in error. The bottom wall of frame 61 has a pair of holes 76 permitting the chad to fall to the bottom of the machine.

Figure 5:
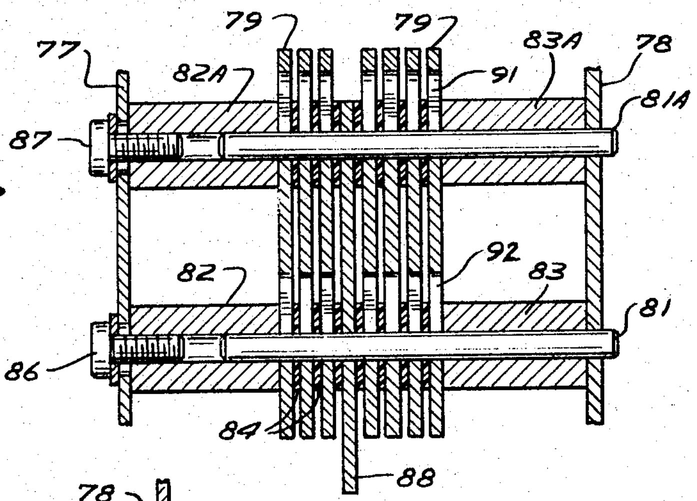
FIGURE 5 is an enlarged sectional view taken along the line 5—5 of FIGURE 3.

As shown in FIGURE 7, the first motion selection and transmitting means 39 is transversely located between upright frame walls 77 and 78 adjacent the rear ends of punches 62. Motion selection and transmitting means 39 comprises an array of eight actuator links 79 located in alignment with punches 62. Links 79 are mounted for pivotal and upright movement on a pair of spaced rods 81 and 81A. As shown in FIGURE 5, sleeves 82, 82A and 83, 83A located on opposite sides of the links 79 spaces the rods from walls 77 and 78. Antifriction spacers 84, as nylon washers, are located between adjacent links 79 to permit the links to move relative to each other. Bolts 86 and 87 secure the sleeves 82 and 82A respectively to frame wall 77. The fourth sprocket link 88 projects below the remaining links. The lower section of link 88 has a transverse slot for accommodating rod 81. The upper end of link 88 has a hole for receiving rod 81A thereby pivotally mounting the link on rod 81A and preventing upright movement of the link relative to the rod.

As shown in FIGURE 3, links 79 have an upper longitudinally elongated slot 91 accommodating upper rod 81A and a lower enlarged inverted L-shaped slot 92 accommodating lower rod 81. Slots 91 and 92 permit the information links 79 to move in up and down directions into alignment with the rear ends of punches 62. The lower inverted L-shaped slots 92 allow information links 79 to individually move toward and away from punch assembly 24. Springs 93 connected to each of links 79 bias the links in an upward and forward direction away from the rear ends of punches 62.

Transversely located between synchronizing rotor 38 and actuator links 79 is a bail 94 carried on a transverse rod 96. As shown in FIGURE 7, the ends of rod 96 project through elongated slots 97 and 98 in frame walls 77 and 78 respectively. Sleeves 99 and 101 positioned on rod 96 adjacent opposite ends of bail 94 locate the bail in alignment with the back sides of actuator links 79. Hooked to the outer ends of rod 96 are springs 102 and 103 which bias the rod in a rearward direction holding sleeves 99 and 101 into engagement with punch cams 49 and 51.

Figure 6:
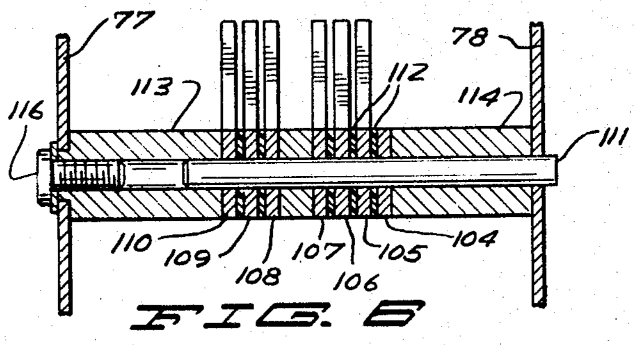
FIGURE 6 is an enlarged sectional view taken along the line 6—6 of FIGURE 3.

The coded control mechanism 42 has seven selector links 104 to 110 to provide two columns of octal data and a seventh level or position to represent a zero. Error punch 68 is used too in an eighth position. As shown in FIGURES 3 and 6, selector links are located in side-by-side spaced relation in alignment with actuator links 79 with the forward end of each selector link engageable with the upper rounded end of an aligned actuator link. All of the selector links are slidably mounted between upright frame walls 77 and 78 on transverse rods 111 and 117. Spacer washers 112 are located between adjacent links. Sleeves 113 and 114 space the links from the walls 77 and 78. A bolt 116 secures sleeve 113 to wall 77. The forward ends of links 104 to 110 are carried on rod 117 which is similar to rod 111 and are spaced from each other with washers (not shown). Each link 104 to 110 has a longitudinal forward slot 118 and a longitudinal rear slot 119 receiving rods 117 and 111. The forward ends 121 of the selector links incline upwardly and are in alignment with the upper rounded ends of the actuator links 79. Springs 122 connected to each of the selector links bias the links in a rearward direction away from actuator links 79.

Figure 4:
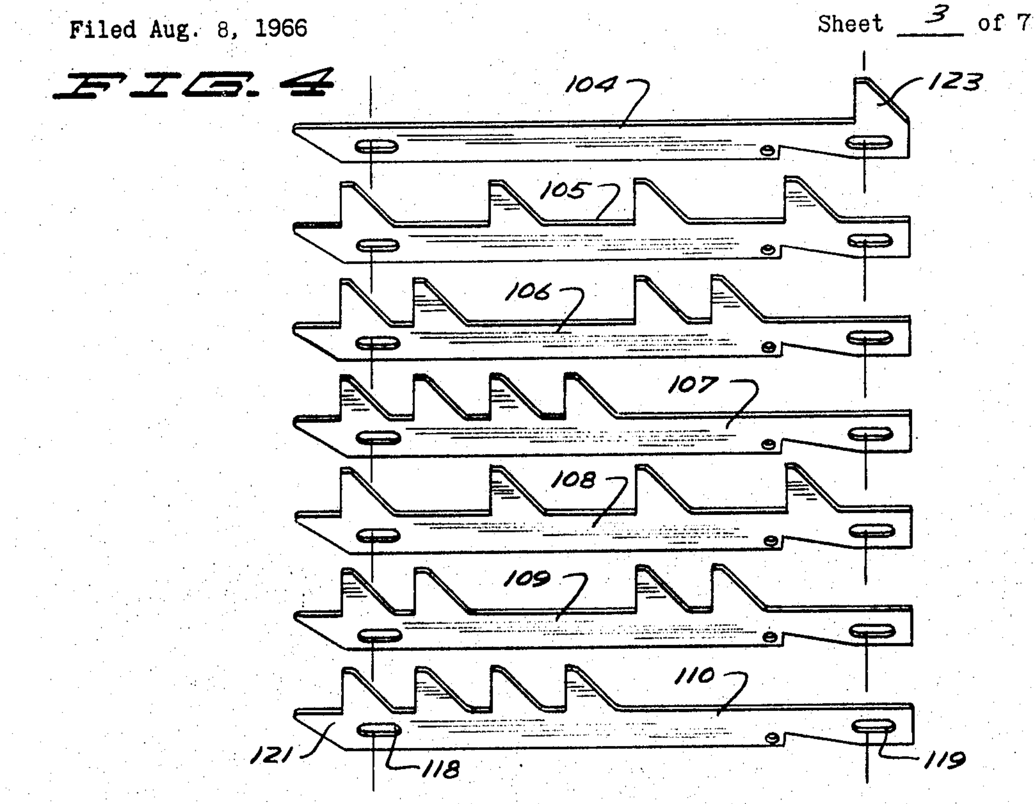
FIGURE 4 is an expanded perspective view of the selector links of the tape punch.

As shown in FIGURE 4, each selector link has at least one upright triangular shaped code tooth 123 located in one or more of eight longitudinal positions along the link. Link 104 has a tooth 123 in the first position. Links 105 and 108 have teeth in the second, fourth, sixth and eighth positions. Links 106 and 109 have teeth in the third, fourth, seventh and eighth positions. Links 107 and 110 have teeth in the fifth, sixth, seventh and eighth positions. Teeth 123 cooperate with upright keys 124 slidably mounted in housing top wall 127 and a sub-frame 133 to force selected links in a forward direction against the biasing force of springs 122. Movement of a selector link forces and holds an actuator link in a down position. Each key 124 has a push button 128 on the upper end identified with the numbers zero to seven. As shown in FIGURE 2, two columns of keys having push butons are arranged side-by side. Each column represents a column of octal data.

Figures 10, 11:
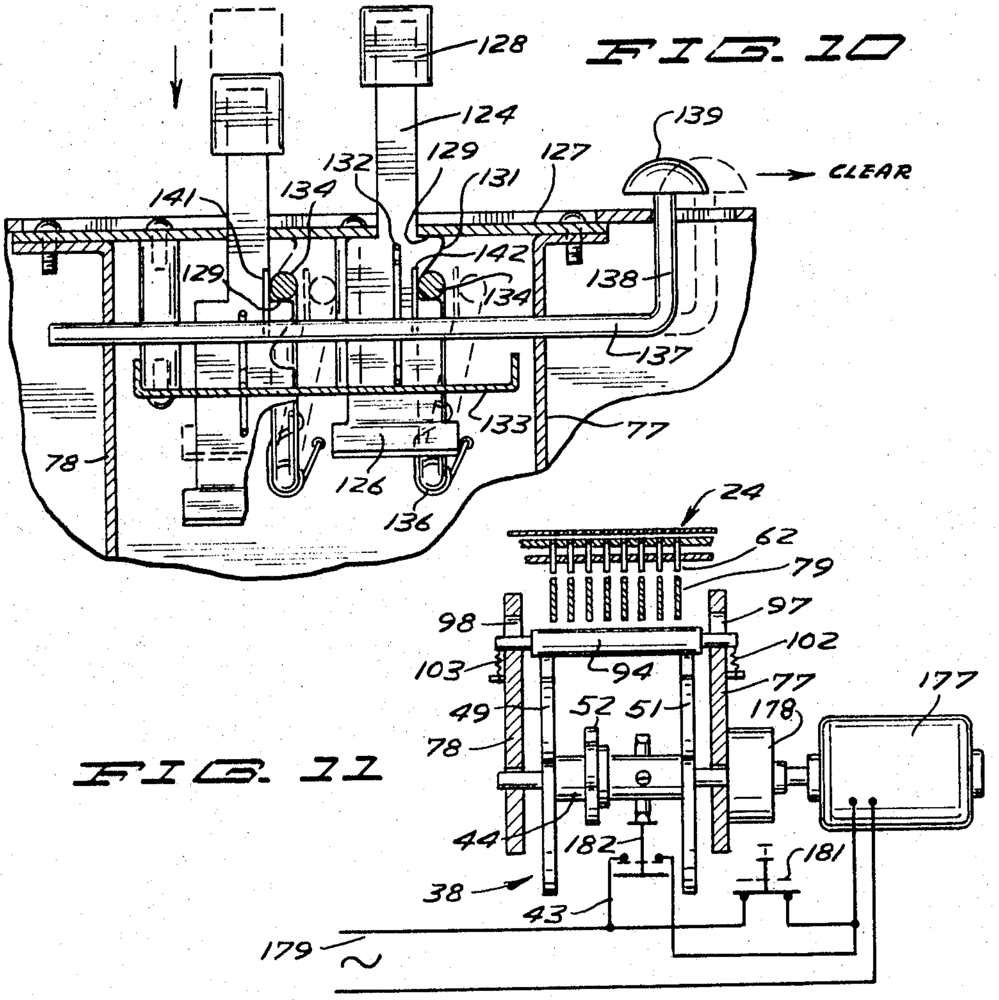
FIGURE 10 is a sectional view taken along the line 10—10 of FIGURE 3.
FIGURE 11 is an electrical-mechanical diagram of the power system for the rotor used to operate the punch assembly.

As shown in FIGURE 10, key 124 has a bottom flange 126 adapted to engage the inclined surfaces of adjacent teeth 123 of three of the selector links. Each key has an outwardly directed shoulder 129 which bears against the top wall 127 to fix the up position of the key. Positioned below shoulder 129 is a notch or recess 131 for accommodating a U-shaped locking arm 134. A torsion coil spring 132 having outwardlly projected legs secured to key 124 and sub-frame 133 biases the key in an upright direction holding shoulder 129 in engagement with top wall 127. Each key has a similar return spring. Locking arm 134 is biased by a spring 136 into engagement with the side of the key 124 forcing the locking arm into recess 131. When the key is in a down position, as shown by the left key in FIGURE 10, locking arm 134 is located over shoulder 129 holding the key in the down position. When the key is in the down position one or more selector links are held in the forward position in engagement with the actuator links 79 aligned with the selector links. The selector links locked by the key hold the actuator links in a down position in alignment with the rear ends of punches 62.

As shown in FIGURE 10, when a key 124 is moved to the down position the locking arm 134 is initially pivoted to a release position whereby all keys that are in the lock position are biased to the up unlock position by the spring 132 associated with the key.

In the event that a key is erroneously locked in the down position it can be unlocked by a clear control comprising a transverse rod 137 having an upright arm 138 carrying a button 139. The rod extends through suitable holes in walls 77 and 78 under locking arm 134 and has a pair of upwardly projected fingers 141 and 142 engageable with rods 134. As shown in broken lines in FIGURE 10, button 139 and rod 137 are moved to the right carrying locking arms 134 to release positions thereby allowing all keys 124 to be biased in an upward direction.

Figure 13:
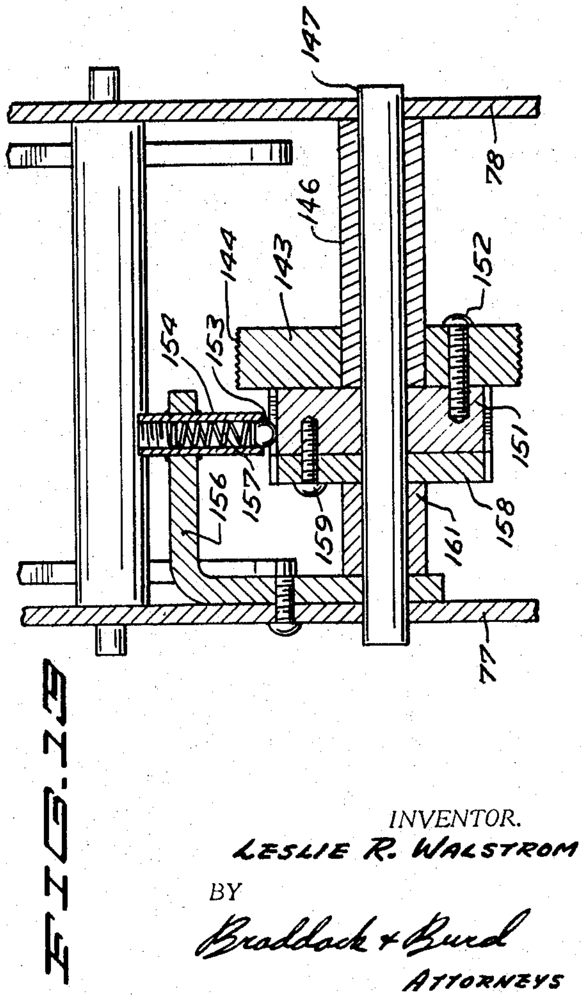
FIGURE 13 is an enlarged sectional view taken along the line 13—13 of FIGURE 8.

The tape drive mechanism 29 comprises a wheel 143 having a knurled peripheral surface 144 in engagement with the lower side of tape 27. As shown in FIGURES 3 and 8, wheel 143 is located below punch assembly 24 with a forward portion of the periphery projected through a hole in the front wall 26 engaging the inside surface of tape 27. The tape is held in engagement with the periphery of wheel 143 by a roller 148 biased in an inward direction by springs 149 located on opposite sides of the roller. FIGURE 13 shows wheel 143 mounted on a sleeve 146 carried by a transverse rod 147. The opposite ends of rod 147 project through suitable holes in walls 77 and 78. An index wheel 151 located adjacent the wheel 143 is secured thereto with a bolt 152. The peripheral surface of wheel 151 has a plurality of teeth which cooperate with a holding ball 153 to releasably hold wheel 143 in one of a plurality of indexed positions. Ball 153 is located in the bottom portion of a tubular member 154 carried on an L-shaped arm 156 secured to side wall 77. A spring 157 positioned within tubular member 154 biases ball 153 in a downward direction into engagement with the peripheral teeth on index wheel 151.

The second motion transmitting means 41 is a one-way ratchet and pawl drive operable to move wheel 143 to successive index positions thereby advancing tape 27 to the next information receiving station. As shown in FIGURE 13, a ratchet wheel 158 is secured to the side of index wheel 151 by bolt 59. A sleeve 161 spaces the ratchet wheel from the side wall 77. As shown in FIGURES 8 and 9, a pivoted pawl 162 mounted on a pin 163 engages the teeth of ratchet wheel 158 to turn the ratchet wheel in small angular increments. Pin 163 is secured to the side of an elongated slide 164 having a pair of spaced longitudinal slots 166 and 167 accommodating bolts 168 and 169 securing slide 164 to support structure attached to the wall 77 enabling the slide to reciprocate in a longitudinal direction.

Slide 164 has a laterally projected stop 172 located rearwardly of the driving arm of pawl 162. As shown in FIGURE 8, a torsion coil spring 171 biases the pawl into engagement with stop 172. A return spring 173 connected to slide 164 and a bracket 174 secured to support structure biases the slide in a rearward non-driving direction and resiliently holds a roller 176 mounted on the rear end of slide 164 in engagement with drive cam 52 of the rotor 38.

As shown in FIGURE 11, rotor 38 is driven by an electric motor 177 coupled to a speed reduction unit 178. Unit 178 drives shaft 47 secured to and projected laterally from rotor 38. Motor 177 is connected to a source of power 179 through a pair of on-off switches 43 and 181 connected in parallel. Switch 181 is a manual on-off switch mounted on the top wall 127 above clear button 139 as shown in FIGURE 2. Switch 43 operates in response to rotation of rotor 38. As shown in FIGURE 9, switch 43 has an actuator 182 carrying an upright block 183 engageable by each radial finger 53 of the rotor to hold the switch in the off position. In use, switch 181 is initially pushed to the on position thereby energizing electric motor 177 which in turn rotates rotor 38. As soon as finger 53 leaves block 183 switch 43 closes thereby connecting motor 177 in the circuit independently of the manual on-off switch 181. The motor will continue to rotate the rotor until the next finger 53 moves switch 43 to the off position. As rotor 38 turns punch assembly 24 and tape advancing mechanism 41 are sequentially operated.

Figure 15:
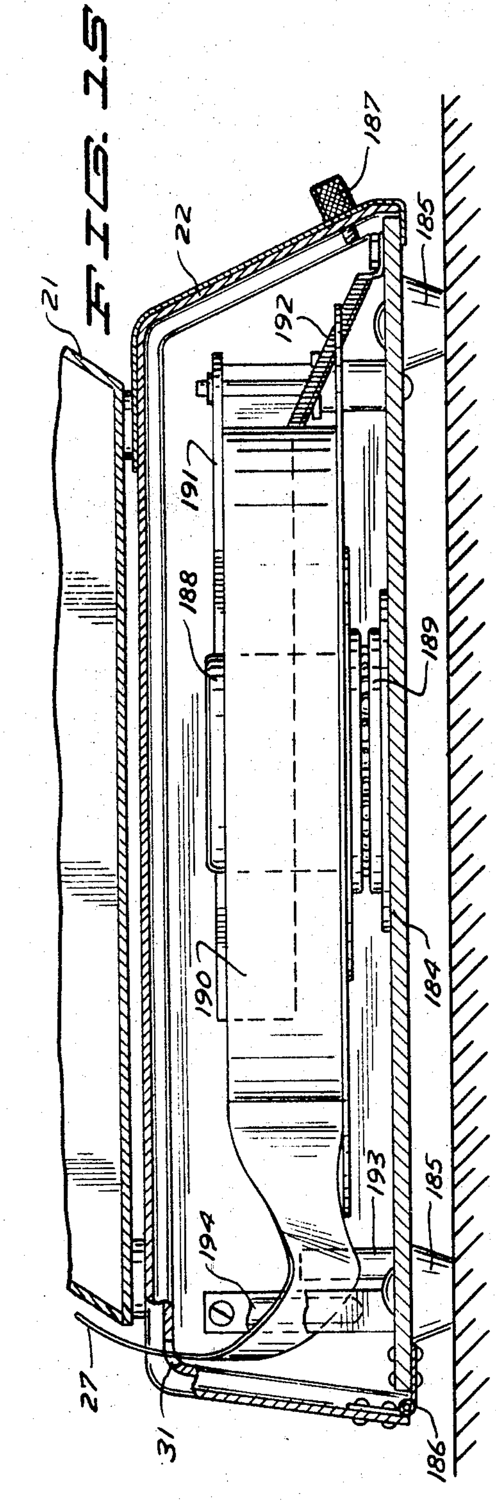
FIGURE 15 is an enlarged sectional view taken along the line 15—15 of FIGURE 14.

As shown in FIGURES 14 and 15, base 22 has a flat bottom wall 184 having short legs 185 for supporting the entire machine on a supporting surface. Hinges 186 secure one side of bottom wall 184 to base 22. A lock device 187 releasably attaches the opposite side of wall 184 to base 22 whereby the bottom wall may be pivoted to an open position providing access to the chamber within the base. An upright spindle 188 rotatably mounted on a bearing 189 secured to the midportion of wall 184 projects up into the chamber. A spool of tape 190 positioned about spindle 188 is free to rotate on bearing 189. The spool of tape can be replaced when necessary. An elongated arm 191 pivotally mounted to bottom wall 184 is biased into engagement with the periphery of the tape by spring 192 to maintain the tape on the spool. As the tape leaves the spool it moves around an upright guide post 193 and under an inclined post 194 upwardly through the elongated slot 31 in the base toward the punch assembly 24.

Preparatory to the actual punching of the tape, the operator sets up the machine by depressing two numerical buttons on the keyboard. The depressed keys engage teeth 123 on the selector links moving one or more of the selector links in a forward direction. Selector links 104 to 107 are actuated by depression of the push buttons in the right hand column and selector links 108 to 110 are actuated by depression of the push buttons in the left hand column. As shown in FIGURE 4, with the exception of link 104, teeth 123 on the remaining groups of three links consist of an array of teeth in binary-coded representation of octal notation.

When depressed the flange 126 of each key slides against the associated inclined surface of one or more teeth on the selector links moving the selector link or links in a forward direction. On downward movement of a key lock arm 134 is moved in a lateral direction releasing any other key which may have been previously depressed and locked. When the key reaches the bottom of its travel the lock arm moves over shoulder 129 to hold the key in the depressed position until some other key entry is made in that column.

As the selector link moves in the forward direction the inclined forward end 121 engages the round top of an actuator link. The forward motion of any selector link depresses the corresponding actuator link so as to bring it into alignment with the bail 94 which rides on the surfaces of punch cams 49 and 51.

If an error is made in depressing the keys, clear button 139 is moved to the right releasing locking arms 134 whereby all depressed keys are moved to the raised positions releasing all the selector links. After the correct selected keys have been depressed the operator then presses the PUNCH button actuating switch 181. As shown in FIGURE 11, when switch 181 is actuated motor 177 is connected to power source 179. The motor turns rotor 38 which drives bail 94 toward punch assembly 24. As punch cams 49 and 51 rotate lobes 54 drive bail 94 and pivot the actuator links 79 held in a down position toward the punch assembly. The links which are down engage the rear ends of aligned punches and move the forward ends of the punches into holes 58 in plate 57 thereby perforate the tape with a drive hole and the selected information holes. Chad from plate 57 falls downwardly over shield 34 into chad box 28. As soon as lobes 54 move from bail 94 springs 102 and 103 at the ends of rod 96 bias the bail in a rearward direction. Springs 93 connected to the actuator links 79 move the actuator links from the ends of punches 62 allowing springs 66 to bias the punches to their initial non-punch positions as shown in FIGURE 3.

After the punches have been retracted from plate 57 the second motion transmitting means 41 is operated by cam 52 to angularly index wheel 43 moving the tape 27 to the next information receiving station. The lobes 56 of cam 52 are circumferentially located relative to lobes 54 of cams 49 and 51 so that slide 164 is moved in a forward direction after the punching operation has occurred. As slide 164 moves in a forward direction pawl 162, as shown in FIGURE 8, engages a tooth of ratchet wheel 158 angularly moving the ratchet wheel. The ball detent 153, as shown in FIGURE 13, holds the wheel 143 in the indexed position. As soon as lobe 56 moves over roller 176 spring 173 moves the slide back to its initial position. Pawl 162 slides over the rearwardly inclined teeth of the ratchet wheel eliminating reverse driving of the ratchet wheel.

The fingers 53 are in general alignment with the lobes 56 of cam 52 so that as soon as slide 164 is in its initial position a finger 53 engages switch block 183 forcing switch 43 to an open position thereby opening the circuit to the electric motor 177. This stops the rotor and completes one cycle of the machine.

At this point the operator may discover an error in the keyboard entry. This error is indicated on the tape by perforating an extra hole parallel to the erroneous punchholes in the eighth level position. The error punch 68 located on the back side is depressed placing a hole in the tape adjacent one side of the erroneous punched holes.

The foregoing disclosure relates only to the preferred embodiment of the invention and it is intended to cover all changes and modifications which do not depart from the spirit and scope of the invention. The invention is defined in the following claims.

The embodiments of the invention in which an exclusive property or privilege is claimed are defined as follows:

1. A machine for perforating sheet means to provide the sheet means with information comprising a punch assembly having a plurality of movable punches and a die having holes aligned with the punches, said punches movable to a first position into said holes to perform a punching operation, said die being spaced from the forward ends of the punches enabling the sheet means to move between the die and punches when the punches are in a second position spaced from the die, drive means engageable with the sheet means for intermittently moving the sheet means relative to the die and punches, rotor means moving at least one punch to the first position and operating the drive means in timed relation with respect to each other, first power transmitting means operably connecting the rotor means with the punches, said power transmitting means having actuator links selectively movable between the rotor means and the punches and second power transmitting means operably connecting the rotor means and the drive means so that rotation of the rotor means intermittently advances the sheet means relative to the die and punches from one information receiving station to the next information receiving station.

2. The machine of claim 1 wherein said sheet means is supplied from a tape wound on a spool, said machine having a housing including a spindle for carrying the spool.

3. The machine of claim 1 including a motor for rotating said rotor means, switch means operable to selectively couple the motor to a source of power, said rotor means having a plurality of spaced fingers to operate said switch means to stop the rotor means at non-punch positions.

4. The machine of claim 3 including a movable transverse bail located between the actuator links and the rotor means, said rotor means having first non-circular cam means engaging said bail to move the actuator links into engagement with the punches, and a second non-circular cam for moving the second power transmitting means to operate the drive means to advance the sheet means to the next information receiving station.

5. The machine of claim 1 including a movable transverse bail located between the actuator links and the rotor means, said rotor means having first non-circular cam means engaging said bail to move the actuator links into engagement with the punches, and a second non-circular cam for moving the second power transmitting means to operate the drive means to advance the sheet means to the next information receiving station.

6. The machine of claim 1 wherein said punch assembly has a plurality of information punches and a sprocket punch, said first power transmitting means including an actuator link interposed between the rotor means and the sprocket punch whereby on each rotation of the rotor means a sprocket hole is made in the sheet means.

7. The machine of claim 1 wherein said drive means includes a wheel having a peripheral surface engageable with one side of the sheet means, roller means holding the sheet means in engagement with said peripheral surface and a detent to hold the wheel in index positions whereby the sheet means intermittently advances between the die and punches.

8. The machine defined in claim 1 including coded selector links engageable with the actuator links, a plurality of keys engageable with the selector links, said keys being movable to shift the selector links thereby moving selected actuator links in alignment with the rotor means and the punches.

9. The machine defined in claim 1 wherein said second power transmitting means includes a ratchet wheel secured to said drive means, a reciprocating member driven by the rotor means, a pawl mounted on the reciprocating member and engageable with said ratchet wheel to rotate the ratchet wheel on movement of the reciprocating member in one direction and detent means for holding the drive means in indexed positions.

10. A machine for perforating sheet means comprising a punch assembly having at least one movable punch and a die having a hole aligned with the punch, said punch movable to a first position into said hole to perform a punching operation, said die being spaced from the forward end of the punch enabling the sheet means to move between the die and punch when the punch is in a second position spaced from the die, drive means engageable with the sheet means for intermittently moving the sheet means relative to the die and punch, rotor means moving said punch to the first position and operating the drive means in timed relation with respect to movement of the punch whereby the sheet means is sequentially punched and moved through the punch assembly, motor means for driving said rotor means, power transmitting means operably connecting the rotor means with the punch, said power transmitting means having at least one actuator link selectively movable between the rotor means and the punch, and a motor control for intermittently operating the motor means including means operable by the rotor means to stop said motor means in timed relation with respect to the punch and tape advancing operations.

11. The machine defined in claim 10 wherein said motor means is an electric motor and said motor stopping means is an on-off switch operable in response to movement of said rotor means.

12. The machine defined in claim 10 wherein said motor means is an electric motor and said motor control includes a first manually operated switch and a second on-off switch, said rotor having a cam engageable with said second switch to operate the second switch in timed relation in respect to the punch and tape advancing operations.

References Cited

UNITED STATES PATENTS

| | | | |
|---|---|---|---|
| 2,427,387 | 9/1947 | Cox | 234—51 X |
| 2,845,122 | 7/1958 | Lake et al. | 234—51 |
| 3,049,286 | 8/1962 | Dreyer et al. | 234—51 |
| 3,051,377 | 8/1962 | Bradbury | 234—115 |
| 3,095,141 | 6/1963 | Baer | 234—92 X |
| 3,107,050 | 10/1963 | Maejima et al. | 234—51 X |
| 3,263,914 | 8/1966 | Huber | 234—51 X |

WILLIAM S. LAWSON, *Primary Examiner.*

U.S. Cl. X.R.

234—51, 105, 111, 119, 123, 128